United States Patent
Widergren et al.

(10) Patent No.: US 9,552,855 B2
(45) Date of Patent: Jan. 24, 2017

(54) ACCESSING A SERIAL NUMBER OF A REMOVABLE NON-VOLATILE MEMORY DEVICE

(75) Inventors: Robert D. Widergren, Campbell, CA (US); John L. Douglas, Santa Cruz, CA (US); Eric R. Hamilton, Los Gatos, CA (US)

(73) Assignee: Mo-DV, Inc., Campbell, CA (US)

( * ) Notice: Subject to any disclaimer, the term of this patent is extended or adjusted under 35 U.S.C. 154(b) by 478 days.

(21) Appl. No.: 12/822,138

(22) Filed: Jun. 23, 2010

(65) Prior Publication Data

US 2010/0332724 A1    Dec. 30, 2010

Related U.S. Application Data

(60) Provisional application No. 61/221,029, filed on Jun. 26, 2009.

(51) Int. Cl.
| | |
|---|---|
| *G06F 12/14* | (2006.01) |
| *G11C 7/16* | (2006.01) |
| *G06F 21/00* | (2013.01) |
| *G11C 7/24* | (2006.01) |

(52) U.S. Cl.
CPC ............... *G11C 7/16* (2013.01); *G06F 12/14* (2013.01); *G06F 12/1416* (2013.01); *G06F 21/00* (2013.01); *G11C 7/24* (2013.01)

(58) Field of Classification Search
USPC ............ 711/115, 154, 163; 726/26–33
See application file for complete search history.

(56) References Cited

U.S. PATENT DOCUMENTS

| 5,015,886 | A | 5/1991 | Choi et al. ............ 307/465 |
| 7,503,072 | B2* | 3/2009 | Hughes et al. ............ 726/26 |
| 7,971,017 | B1* | 6/2011 | Mann et al. ............ 711/163 |
| 2005/0005149 | A1 | 1/2005 | Hirota et al. ............ 713/193 |
| 2006/0184720 | A1* | 8/2006 | Sinclair et al. ............ 711/103 |
| 2006/0202232 | A1 | 9/2006 | Takami ............ 257/209 |
| 2007/0121625 | A1* | 5/2007 | Youn et al. ............ 370/389 |

OTHER PUBLICATIONS

International Search Report and Written Opinion, PCT/US2010/039911, Dec. 10, 2010, 8 pages.

* cited by examiner

*Primary Examiner* — Arpan P. Savla
(74) *Attorney, Agent, or Firm* — Blakely, Sokoloff, Taylor & Zafman LLP

(57) ABSTRACT

A removable non-volatile memory device durably stores a serial number or identifier, which is used to mark multimedia content legally stored on the removable non-volatile memory device. In order to retrieve the serial number, a host electronic system coupled to the removable non-volatile memory device sends a sequence of multiple file access commands to access a predefined target file stored on the removable non-volatile memory device. In accordance with the executed predefined sequence of multiple file access commands, a corresponding sequence of data access commands are received at the removable non-volatile memory device and are interpreted as a request by the host electronic device to read the serial number. The removable non-volatile memory device outputs the serial number in response to the sequence of data access commands.

26 Claims, 5 Drawing Sheets

ACCESSING A SERIAL NUMBER OF A REMOVABLE NON-VOLATILE MEMORY DEVICE

RELATED APPLICATIONS

This application claims priority to U.S. Provisional Patent Application No. 61/221,029, filed Jun. 26, 2009, entitled "Accessing a Serial Number of a Removable Non-Volatile Memory Device," which is incorporated herein by reference in its entirety.

TECHNICAL FIELD

The disclosed embodiments relate generally to removable non-volatile memory devices, and in particular to accessing a serial number assigned to a removable non-volatile memory device.

BACKGROUND

Multimedia memory cards (MMCs) and other storage card formats are well known today as a means of providing external memory capacity for storing information of interest to a user. Such cards are typically used in portable devices such as cellular phones, personal digital assistants (PDA), digital cameras, etc. to store data and can be connected to a general purpose personal computer to transfer data therebetween.

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings in which like reference numerals refer to corresponding parts throughout the figures. Optional operations or components are indicated by dashed lines in the figures.

DESCRIPTION OF EMBODIMENTS

Figure 1:
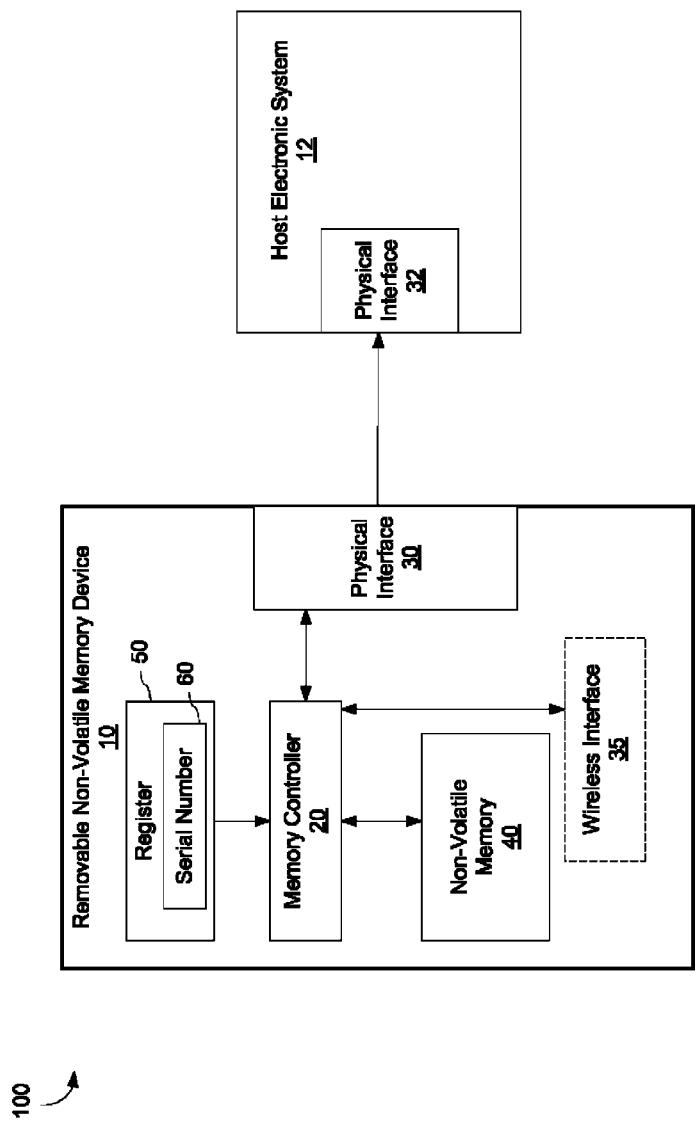
FIG. 1 is a block diagram illustrating an example of a multimedia storage and access system in accordance with one embodiment.

Methods and systems for accessing multimedia content stored a non-volatile memory of a removable non-volatile memory device are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention as defined by the appended claims.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well-known to those of ordinary skill in the art are not described in detail to avoid obscuring aspects of the present invention.

The embodiments described below concern devices, systems and methods in which multimedia content stored on a memory card is "protected" using the manufacturer assigned serial number. For example, in these embodiments one or more aspects of the multimedia content are arranged to prevent decoding or playing of the multimedia content if the multimedia content is copied to another device having a different serial number or if the multimedia content is copied to another type of device altogether (e.g., the disk drive or other non-volatile storage of a host device). In some embodiments, the multimedia content is protected by encrypting or encoding it using a key or methodology that depends on the serial number of the memory device. In other embodiments, another protection scheme is used, such as storing the serial number in the header of a file that contains the multimedia content, and encoding the multimedia content so that only a proprietary player can play the multimedia content or only a proprietary decoder can decode the multimedia content. In these embodiments, the proprietary player or decoder is configured to determine whether the serial number in the file header of the multimedia content file is consistent with the serial number of the memory card, and enables the multimedia content to be played or decoded only when the two are consistent.

In all of these embodiments, a host device needs to be able to retrieve the memory card's serial number or identifier. However, in some host devices, such as host devices using a multimedia player that is implemented in Java, the ordinary ways of retrieving memory card's serial number or identifier do not work (e.g., due to security restrictions imposed by the Java virtual machine). The embodiments described below provide devices, systems and methods that overcome this problem, and enable virtually all host devices to retrieve the memory card's serial number or identifier.

FIG. 1 is a block diagram illustrating an example of a multimedia content storage and retrieval system 100 according to one embodiment. FIG. 1 shows various functional components that will be referred to in the detailed discussion that follows. This system 100 includes a removable non-volatile memory storage device 10 and a host electronic system 12. The removable non-volatile memory storage device 10 and the host electronic system 12 include physical interfaces 30 and 32 respectively for removably interconnecting the removable non-volatile memory storage device 10 and the host electronic system 12.

The removable non-volatile memory storage device 10, such as a flash memory card, is a mass storage device. It includes non-volatile memory 40, such as, flash memory. In some embodiments, the non-volatile memory 40 includes one or more nonvolatile memory chips that can be programmed by a user. Once programmed, the storage memory retains its data until over-written or erased. Contents of the one or more non-volatile memory devices 40 are discussed with reference to FIG. 2.

According to some embodiments, the removable non-volatile memory storage device 10 also durably stores a manufacturer assigned serial number 60, for instance, in a register 50. The manufacturer assigned serial number 60 may include a sequence of alpha-numeric characters that identify the removable non-volatile memory storage device 10. The manufacturer assigned serial number 60 is sometimes called an identifier. In some embodiments, instead of or in addition to storing the serial number 60 in register 50, the manufacturer assigned serial number 60 may be stored in the one or more non-volatile memory devices 40. In most embodiments, the serial number 60 cannot be over-written or erased. Further, in some embodiments, the serial number 60 is unique to the removable non-volatile memory storage device 10. In other embodiments, however, the manufacturer of the removable non-volatile memory storage device 10 may reuse serial numbers when manufacturing large numbers of removable non-volatile memory storage devices (e.g., thousands of removable non-volatile memory storage devices), such that the manufacturer assigned serial number 60 is relatively unique to the removable non-volatile memory storage device 10.

The removable non-volatile memory storage device 10 also includes a memory controller 20, which communicates with the host electronic system via the physical interface 30 to access the non-volatile memory 40. The memory controller 20 is discussed further with reference to FIG. 4. In some embodiments, the removable non-volatile memory storage device 10 optionally includes a wireless connection 35 for wirelessly communicating with one or more networks, such as the Internet.

Host electronic system 12 can be any of a number of devices (e.g., an internet kiosk, personal digital assistant, cell phone, gaming device, desktop computer, or laptop computer) used to enable the activities described below. Host electronic system 12 may also include audio and/or video inputs (e.g., a microphone and a video camera), audio output (e.g., speakers or headphones), and video output (e.g., a display) (not shown). The host electronic system 12 is further discussed with reference to FIG. 5.

Figure 2:
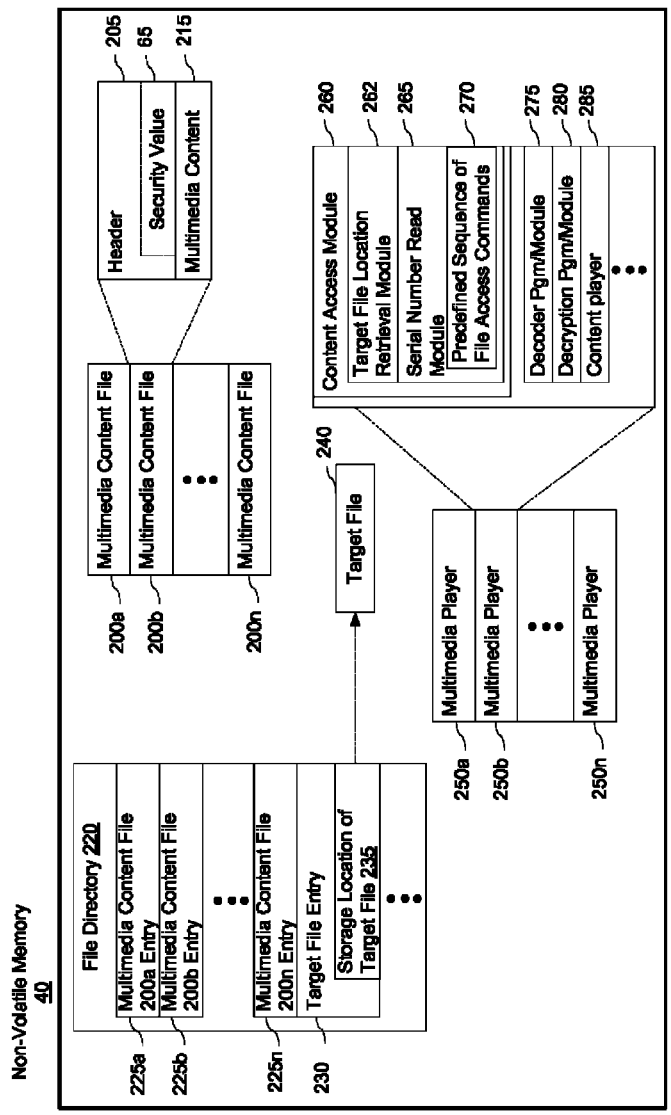
FIG. 2 is a block diagram illustrating an example of contents of a non-volatile memory of a removable non-volatile memory device.

FIG. 2 illustrates contents of the non-volatile memory 40, according to some embodiments. The non-volatile memory 40 stores one or more multimedia content files 200a-n, such as one or more audio files, video files, audio-video files, etc. Prior to being loaded into non-volatile memory 40, multimedia content files 200a-n may be encoded and/or encrypted according to an appropriate scheme or schemes. For ease of discussion, the following description will assume that both encryption and encoding are applied to a given multimedia file, although embodiments of the present invention contemplate application of only one of encoding or encryption, as appropriate.

A multimedia content file 200 includes multimedia content 215 (such as, audio content, video content, audio-video content, etc) and header 205. In some embodiments, in order to ensure that unauthorized copies of the multimedia content file 200 cannot be played or decoded, a security value 65 is included in the header 205 of the multimedia file 200. In the embodiments described here, if the multimedia content file 200 is an authorized copy of the file, the security value 65 in the header 205 is a copy of the manufacturer assigned serial number (or identifier) 60 of the particular removable non-volatile memory storage device (on which the multimedia content file 200 can be stored with authorization). In other embodiments, if the multimedia content file 200 is an authorized copy of the file, the security value 65 corresponds to the serial number (or identifier) of the non-volatile memory storage device 40. For example, the security value 65 can be a value that is a predefined function of the serial number (or identifier), such as the value produced by applying a hash function to the serial number or a value corresponding to the serial number (e.g., a predefined portion of the serial number, the serial number appended to a fixed value, etc.).

The header 205 may include other metadata, such as, author of multimedia content 215, time of storage of the multimedia content file 200 on the removable non-volatile memory storage device 40, and so on. In some embodiments, the multimedia file 200 comprises multimedia content 215 that has been encrypted using a key equal to or otherwise based on the security value 65.

The non-volatile memory 40 also stores a predefined target file 240 having a predefined file name and a predefined storage location. In some embodiments, the predefined target file 240 is a dummy file, and contains no content. The predefined target file 240 is used to enable the host electronic system 12 to read the manufacturer assigned serial number 60, as discussed further with reference to FIG. 3.

The non-volatile memory 40 also stores a file directory 220 that includes multiple entries 225 for files stored on the non-volatile memory 40. Each entry 225 of the file directory 220 corresponds to a respective file stored on the non-volatile memory 40. In some embodiments, a respective entry 225 includes multiple fields, each of which stores the value of an attribute (e.g., name, name extension, size, file storage location in memory 40) of a respective file. The file directory 220 includes entries 225a-n for all of the multimedia content files 200a-n stored on the non-volatile memory 40. The file directory 220 also includes an entry 230 for the target file 240. This entry includes a field 235 that specifies the storage location of the target file 240 on the non-volatile memory 40.

The non-volatile memory 40 also stores one or more multimedia players 250a-n. The multimedia players 250a-n include a plurality of players that are compatible with respective different types of host electronic systems with which the removable non-volatile memory storage device 10 may couple, and/or are compatible with respective different operating systems employable by a host electronic system. For instance, multimedia player 250a may be compatible with a host electronic system that runs a Java® operating system, while multimedia player 250b may be compatible with a host electronic system that runs a Windows® operating system, and so on. Accordingly, in some embodiments, the non-volatile memory 40 stores multiple multimedia players 250 that are compatible with many different commercially available host electronic systems, enabling the removable non-volatile memory storage device 10 to cooperate with a wide variety of devices equipped to present visual and/or auditory information.

In some embodiments, upon coupling of the removable non-volatile memory storage device 10 with a host electronic system 12, one of the multimedia players 250a-n is automatically executed by the host electronic system 12. For example, this may happen due to the automatic execution of an autoexec or autoload program (not shown) stored on the removable non-volatile memory storage device 10. Execution of the multimedia player includes execution of a content access module 260 by the host electronic system 12. The content access module 260 includes a target file location retrieval module 262 to access file directory 220 (e.g., by copying at least a portion of the file directory 220) and retrieve the storage location 235 of the predefined target file 240. The content access module 260 includes a serial number read module 265 for accessing the serial number of removable non-volatile memory storage device 10 by the host electronic system 12. The serial number read module 265 includes a predefined sequence of file access commands 270 that are executed by the host electronic system 12. The content access module 260 is described further with reference to FIG. 3.

Each of the multimedia players 250*a-n* may also include a decoder 275 for decoding multimedia content, decryption software 280 for decrypting multimedia content, and a content player 285 for rendering the multimedia content. In some embodiments, each of the multimedia players 250*a-n* includes respective different versions of the same content decoder software 275 (e.g., multimedia player 250*a* includes a different version of decoder software 275 than multimedia player 250*b*). In some embodiments, each of the multimedia players 250*a-n* includes respective different versions of the same content decryption software 280 (e.g., multimedia player 250*a* includes a different version of decryption software 280 than multimedia player 250*b*). Similarly, in some embodiments, each of the multimedia players 250*a-n* includes respective different versions of the same content player 285 (e.g., multimedia player 250*a* includes a different version of content player 285 than multimedia player 250*b*).

Figure 3:
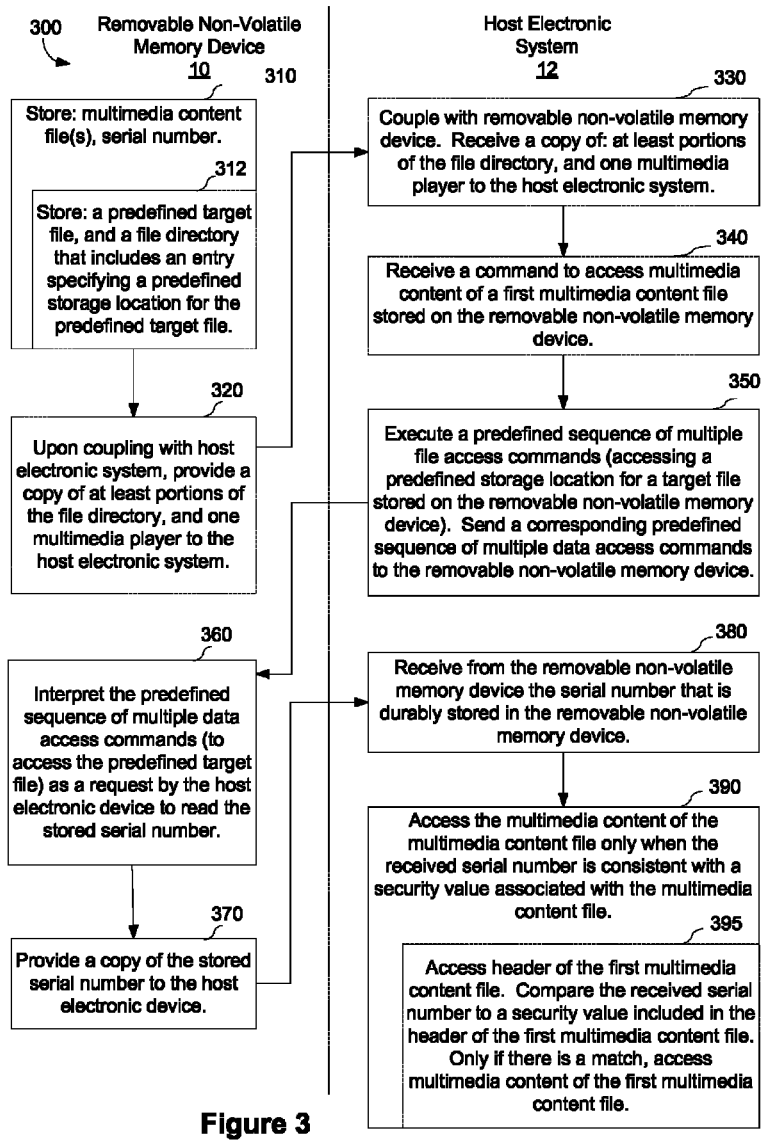
FIG. 3 is a flow diagram of a process for accessing multimedia content stored a non-volatile memory of a removable non-volatile memory device in accordance with one embodiment.

FIG. 3 is a flow diagram of a process 300 for accessing multimedia content stored within a non-volatile memory 40 of a removable non-volatile memory device 10 by a host electronic system 12 in accordance with one embodiment. Optional operations are indicated by dashed lines.

Prior to coupling the removable non-volatile memory device 10 to the host electronic system 12, the removable non-volatile memory device 10 stores the following: one or more multimedia content files 200, and a manufacturer assigned serial number 60 or identifier (310). As discussed with reference to FIG. 2, the one or more multimedia content files 200 are stored in non-volatile memory 40, and serial number 60 is typically durably stored in a register 50. The non-volatile memory 40 of the removable non-volatile memory device 10 also stores a file directory 220 that includes an entry 235 specifying a predefined storage location in non-volatile memory 40 for the predefined target file 240 (312).

Upon coupling of the removable non-volatile memory device 10 to the host electronic system 12 (330), for instance, using interfaces 30 and 32 respectively, the removable non-volatile memory device 10 and the host electronic system 12 communicate so that the removable non-volatile memory device 10 provides a copy of at least portions of the file directory 220 (320) to the host electronic system 12. In addition, in some embodiments, a respective multimedia content player (e.g., 250*b*) is launched (i.e., automatically executed) by the host electronic system 12. In some embodiments, the host electronic system 12 executes a procedure (not shown) to determine which of the multimedia content players 250*a-n* is compatible with the host electronic system 12 (or compatible with its operating system), and then executes the identified multimedia content players 250. In some embodiments, the host electronic system 12 may identify a multimedia content player already present on the host electronic system 12, and execute that multimedia content player. Alternatively, the host electronic system 12 may provide information such as the type of its operating system to the removable non-volatile memory device 10, so that the removable non-volatile memory device 10 may determine which of the multimedia content players 250*a-n* to provide to the host electronic system 12.

The host electronic system 12 receives the copy of at least portions of the file directory 220 and a respective multimedia content player 250 from the removable non-volatile memory device 10 (330).

The host electronic system 12 receives a command to access multimedia content of a first multimedia content file stored on the removable non-volatile memory device (340). The command may be a user command to access the multimedia content file, for instance, in response to the host electronic system 12 displaying a listing of the multimedia content files available on the removable non-volatile memory device 10. Alternatively, the command may issue from an auto-load program.

The host electronic system 12 executes a predefined sequence of multiple file access commands 270 (FIG. 2), for instance, by executing content access module 260 (350). In some embodiments, the host electronic system 12 executes the content access module 260. The target file retrieval module 262 of the content access module 260 accesses the file directory 102 (at least portions of which have been copied over from the removable non-volatile memory storage device 10) to retrieve the storage location 235 of the predefined target file 240. The serial number read module 265 of the content access module 260 includes a predefined sequence of file access commands 270 to access the predefined storage location 235 of the predefined target file 240. In some embodiments, the predefined sequence of file access commands 270 includes several (e.g., three) repeated file access commands which contain illegal parameters that are sent to the removable non-volatile memory device 10 in sequence over a short period of time. In accordance with the executed predefined sequence of multiple file access commands, the host electronic system 12 sends a corresponding sequence of data access commands to the removable non-volatile memory device 10 (350).

The removable non-volatile memory device 10 interprets the predefined sequence of multiple data access commands (to access the predefined target file) as a request by the host electronic device 12 to read the stored serial number 60 (360). In some embodiments, the predefined sequence of multiple data access commands is stored by the memory controller 20. After the last one of the multiple data access commands is received, a trigger function (discussed further with reference to FIG. 4) is triggered. The trigger function is executed by the memory controller 20 to activate a serial number access program (discussed further with reference to FIG. 4) in response to the predefined sequence of multiple data access commands received from the host electronic system 12.

The removable non-volatile memory device 10 provides a copy of the stored serial number 60 to the host electronic system 12 (370). In some embodiments, the serial number access program (triggered by the trigger function) is executed by the memory controller 20 to access the stored serial number 60 and provide a copy of the serial number 60 to the host electronic system 12. In some embodiments, the copy of the serial number 60 is placed by the memory controller 20 in an output register of the physical interface 30 of the removable non-volatile memory device 10 for access by the host electronic system 12.

The host electronic system 12 receives a copy of the serial number 60 that is durably stored in the removable non-volatile memory device 10 (380).

In some embodiments, the host electronic system 12 accesses the multimedia content 215 of a multimedia content file 200 (e.g., selected by a user) only when the received serial number 60 is consistent with (e.g., matches) the security value 65 associated with the multimedia content file 200 (390). In some embodiments, the host electronic system 12 accesses the header 205 of the multimedia content file 200, and compares the received serial number 60 to a security value 65 included in the header 205 of the multimedia content file 200. The host electronic system 12 accesses multimedia content 215 of the multimedia content file 200 only if there is a match between the serial number 60 received from the removable non-volatile memory device 10 and the security value 65 included in the header 205 of the first multimedia content file 200. A lack of match may indicate that the multimedia content file 200 may have been intended for storage on a different removable non-volatile memory device, and may have been illegally stored on the removable non-volatile memory device 10 with which the host electronic system 12 is coupled.

Each of the operations shown in FIG. 3 may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted by one or more processors.

Figure 4:
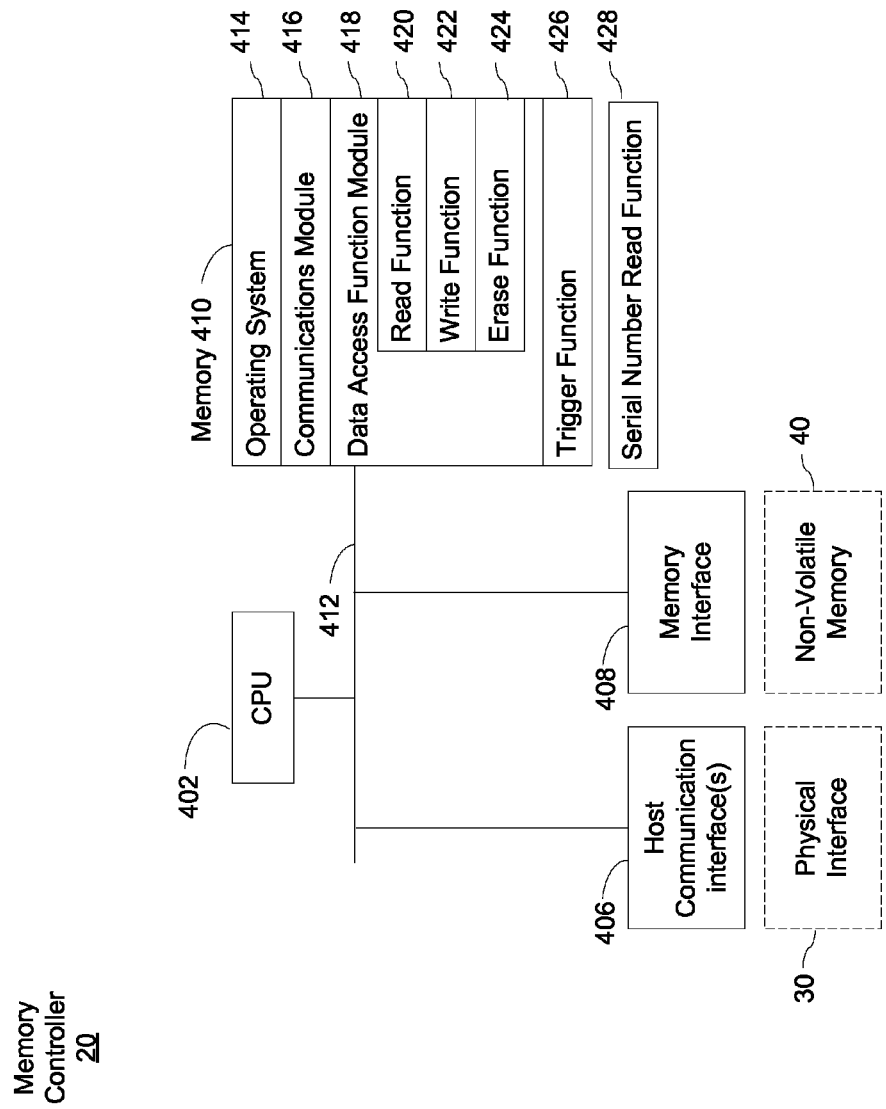
FIG. 4 is a block diagram illustrating an embodiment of a memory controller of a removable non-volatile memory device.

FIG. 4 is a block diagram illustrating an embodiment of the memory controller 20 of the removable non-volatile memory device 10 (FIG. 1). The memory controller 20 typically includes one or more processing units (CPU's) 402 for executing modules, programs and/or instructions stored in memory 410 and thereby performing processing operations; one or more network or other communications interfaces 406 for communicating with the host electronic system 406 (e.g., via the physical interface 30 or via the optional wireless interface 35 shown in FIG. 1); one or more network or other communications interfaces 408 for communicating with the non-volatile memory 40; memory 410; and one or more communication buses 412 for interconnecting these components. The communication buses 412 may include circuitry (sometimes called a chipset) that interconnects and controls communications between system components. The memory controller 20 optionally includes (but typically does not include) a user interface having a display device and a keyboard.

Memory 410 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 410 may optionally include one or more storage devices remotely located from the CPU(s) 402. Memory 410, or alternately the non-volatile memory device(s) within memory 410, comprises a computer readable storage medium. In some embodiments, memory 410 or the computer readable storage medium of memory 410 stores the following programs, modules and data structures, or a subset thereof:

- an operating system 414 that includes procedures for handling various basic system services and for performing hardware dependent tasks; in some embodiments, however, the memory controller 20 does not include an operating system 414;
- a communications module 416 that includes one or more procedures for managing communications between the memory controller 20 and a host electronic system via the host communications interface 406 and physical interface 30 (FIG. 1) or other host communications interface (e.g., wireless interface 35);
- a data access function module 418 that includes data access functions, such as read function 420, write function 422, and erase function 424 that can be performed on multimedia content 215 stored in the multimedia content files 200;
- a trigger function 426, responsive to a predefined sequence of multiple data access commands received from the host electronic system to activate the serial number access program; and
- a serial number access program 428, for accessing the stored serial number or identifier (e.g., stored in a register 50 of the removable non-volatile memory device 10) and providing the serial number to the host electronic system.

Each of the above identified elements may be stored in one or more of the previously mentioned memory devices, and corresponds to a set of instructions. The programs or modules, when executed by the one or more processors of the host electronic system, perform the functions or operations described above. for performing a function described above. The above identified modules or programs (i.e., sets of instructions) need not be implemented as separate software programs, procedures or modules, and thus various subsets of these modules may be combined or otherwise re-arranged in various embodiments. The above identified modules may be implemented using software, hardware, firmware, state machines, or combinations thereof. In some embodiments, memory 410 may store a subset of the modules and data structures identified above. Furthermore, memory 410 may store additional modules and data structures not described above.

Although FIG. 4 shows a memory controller 20, FIG. 4 is intended more as functional description of the various features than as a structural schematic of the embodiments described herein. In practice, and as recognized by those of ordinary skill in the art, items shown separately could be combined and some items could be separated.

Figure 5:
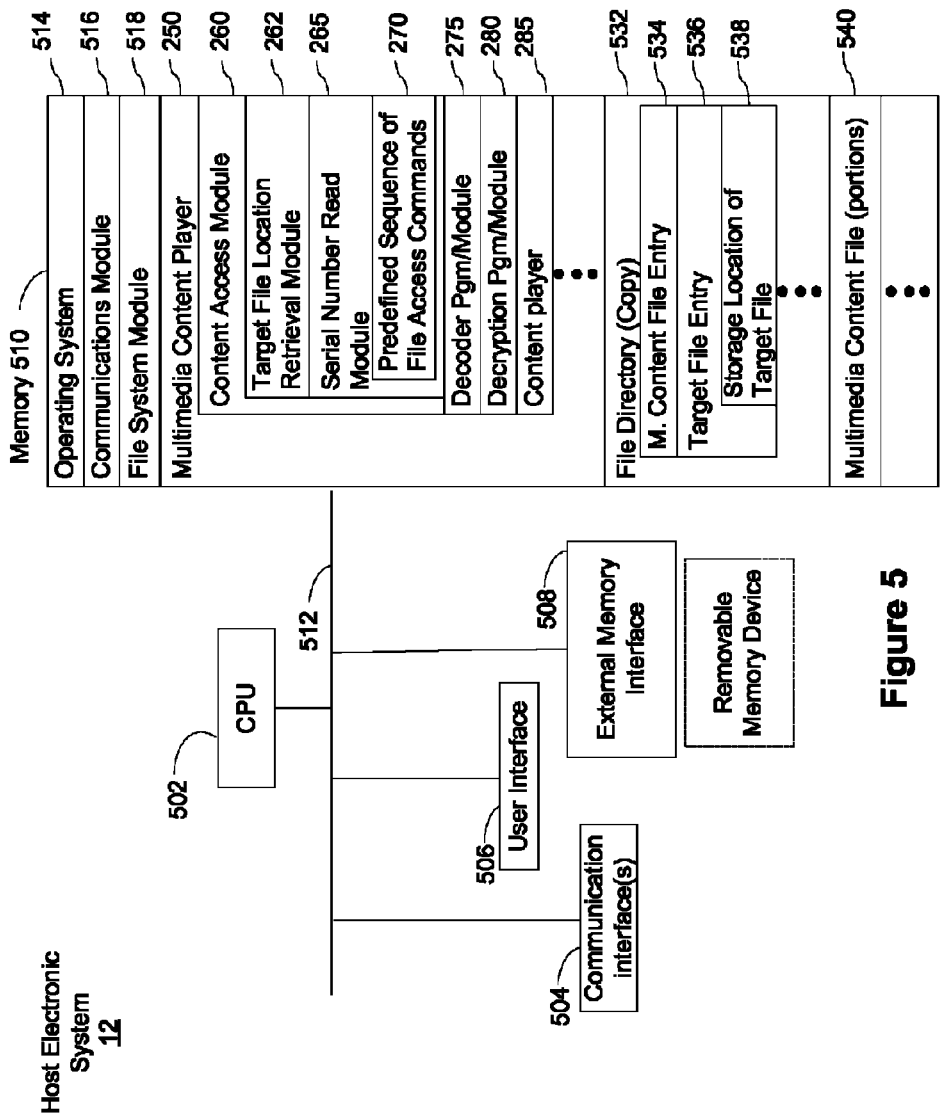
FIG. 5 is a block diagram illustrating an embodiment of a host electronic system that accesses multimedia content stored a non-volatile memory of a removable non-volatile memory device.

FIG. 5 is a block diagram of a host electronic system 12, according to certain embodiments. The host electronic system 12 includes one or more processing units (CPU's) 502, one or more network or other communications interfaces 504, a communication interface 508 for communicating with an external removable non-volatile memory storage device 10, memory 510, and one or more communication buses 512 for interconnecting these components. The communication buses 512 may include circuitry (sometimes called a chipset) that interconnects and controls communications between system components. The host electronic system 12 typically includes a user interface 506. In some embodiments, the user interface includes a display device, a keyboard and a pointer device, while in other embodiments (e.g., a cell phone or personal digital assistant) the user interface includes a touch screen display.

Memory 510 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 510 may optionally include one or more storage devices remotely located from the CPU(s) 502. Memory 510, or alternately the non-volatile memory device(s) within memory 510, includes a computer readable storage medium. In some embodiments, memory 510 or the computer readable storage medium of memory 510 stores the following programs, modules and data structures, or a subset thereof:
- an operating system 514 that includes procedures for handling various basic system services and for performing hardware dependent tasks;
- a network communications module 516 that is used for connecting the host electronic system 12 to other computers via the one or more communication network interfaces 504 and one or more communication networks, such as the Internet, other wide area networks, local area networks, metropolitan area networks, and so on;
- a file system module 518 for managing data files stored in the host electronic system 12;
- a copy of a multimedia content player 250, which may be automatically launched by the host electronic system 12 when the removable non-volatile memory storage device 12 is coupled to the host electronic system 12; additional details of an exemplary multimedia content player 250 are described above with reference to FIG. 2;
- a copy of at least portions of the file directory 220 of the removable non-volatile memory storage device 12;
- at least portions 540 of at least one of the multimedia content files 200; and
- optionally other applications, such as a browser application, for execution by the host electronic system 12.

Each of the identified programs or modules corresponds to a set of instructions. These programs or modules, when executed by the one or more processors of the host electronic system, perform the functions or operations described above. The above identified modules or programs (i.e., sets of instructions) need not be implemented as separate software programs, procedures or modules, and thus various subsets of these modules may be combined or otherwise re-arranged in various embodiments. In some embodiments, memory 510 may store a subset of the modules and data structures identified above. Furthermore, memory 510 may store additional modules and data structures not described above.

Although FIG. 5 shows a host electronic system 12, FIG. 5 is intended more as functional description of the various features than as a structural schematic of the embodiments described herein. In practice, and as recognized by those of ordinary skill in the art, items shown separately could be combined and some items could be separated.

In some alternate embodiments, the value returned to the host system by the serial number access program (e.g., serial number read module 265) is a device signature or validation value, instead of, or in addition to, the serial number of the device. The device signature or validation value is related to the serial number by a predefined function (e.g., by a hash function, encryption function, or the like), but is nonetheless not the same as the serial number. In some embodiments, the validation value is generated by the removable non-volatile memory device by combining the serial number with one or more values provided by the host system (e.g., the file identifier of a file stored in the removable non-volatile memory device, obtained from a file directory in the device) to produce a combined value, and then applying a predefined function (e.g., a hash function, encryption function, or the like) to the combined value to produce the validation value. In yet another alternative, the device signature is independent of the device's serial number.

Furthermore, in some embodiments, the removable non-volatile memory device stores the device signature, for use in validating the removable non-volatile memory device, in addition to the serial number.

Similarly, in some alternative embodiments the security value (65, FIG. 2) stored in the header of a multimedia content file is not the serial number, but instead is a validation value that is related to the serial number (or the device signature) by a predefined function (e.g., by a hash function, encryption function, or the like). In one example, the security value is obtained by combining the serial number with the file identifier of the multimedia content file to produce a combination value, applying (for example) two hash functions (or other functions) to the combination value to obtained two hash values, and combining the two hash values (e.g., by concatenating them) to produce the security value. In some embodiments, the serial number access program (executed by the removable non-volatile memory device) returns the security value to the host system in response to a request that includes a file identifier. Access to the content of the file by the host system is enabled by a content access program (e.g., content access module 260, or multimedia player 250) only if the security value returned by the removable non-volatile memory device to the host system matches the security value 65 in the file's header 205 (FIG. 2).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A removable non-volatile memory device, comprising:
   - an interface for removably coupling the removable non-volatile memory device to a host electronic system;
   - non-volatile memory for storing data, including a multimedia content file;
   - a serial number durably stored in the removable non-volatile memory device;
   - a memory controller;
   - a plurality of programs configured for execution by the memory controller, including:
     - a serial number access program for execution by the memory controller, for accessing the stored serial number and providing the serial number to the host electronic system, and
     - a trigger function for execution by the memory controller, responsive to a predefined sequence of multiple data access commands received from the host electronic system to cause the memory controller to activate the serial number access program, wherein the trigger function is stored in the memory controller, wherein upon receipt, the predefined sequence is stored in the removable, non-volatile memory device; and
   - a content access program, for execution by the host electronic system for the host electronic system to access a predefined target file stored within the non-volatile memory device, the content access program including:
     - first instructions for the host electronic system to read the serial number accessed by the serial number access program from the removable non-volatile memory device by sending to the removable non-volatile memory device the predefined sequence of multiple data access commands.

2. The removable non-volatile memory device of claim 1, further including:
a file directory stored in the non-volatile memory, the file directory including an entry specifying a predefined storage location for the predefined target file stored within the nonvolatile memory,
wherein the predefined sequence of multiple data access commands comprises a sequence of data access commands stored by the memory controller and that access the predefined target file, and
wherein the predefined sequence of multiple data access commands received by the non-volatile memory device from the host electronic system to access the predefined target file is interpreted by the trigger function for execution by the memory controller as a request by the host electronic system to read the stored serial number accessed by the serial number access program from an output register of the non-volatile memory device.

3. The removable non-volatile memory device of claim 1, wherein the predefined sequence of multiple data access commands corresponds to a predefined sequence of multiple file access commands executed at the host electronic system.

4. The removable non-volatile memory device of claim 1, wherein the serial number is unique to the removable non-volatile memory device.

5. The removable non-volatile memory device of claim 4, the content access program including:
second instructions for accessing multimedia content of the multimedia content file stored on the removable non-volatile memory device only when the serial number read from the removable non-volatile memory device matches a serial number associated with the multimedia content file.

6. The removable non-volatile memory device of claim 5, wherein the serial number associated with the multimedia content file is stored in a file header of the multimedia content file.

7. The removable non-volatile memory device of claim 1, wherein the plurality of programs configured for execution by the memory controller includes a program for accessing and conveying the multimedia content file to the host electronic system.

8. The removable non-volatile memory device of claim 1, wherein the plurality of programs configured for execution by the memory controller includes a program for accessing and conveying to the host electronic system specified portions of data stored in the non-volatile memory.

9. A method of enabling access by a host electronic system to a multimedia content file stored on non-volatile memory of a removable non-volatile memory device, the method comprising:
at the removable non-volatile memory device:
receiving a predefined sequence of multiple data access commands from the host electronic system, wherein the predefined sequence is stored in the removable, non-volatile memory device; and
responsive to the predefined sequence of multiple data access commands, a serial number access program of the removable non-volatile memory device reading a stored serial number and providing the read serial number to the host electronic system, wherein:
the serial number is durably stored in the removable non-volatile memory device, and
the host electronic system is configured to access multimedia content of the multimedia content file only when the provided serial number accessed by the serial number access program of the removable non-volatile memory device matches a serial number associated with the multimedia content file.

10. The method of claim 9, further comprising:
storing, in the non-volatile memory, a file directory that includes an entry specifying a predefined storage location for a predefined target file, the predefined target file stored within non-volatile memory, wherein the predefined sequence of multiple data access commands comprises a sequence of data access commands that are stored by the memory controller and that allow the host electronic system to access the predefined target file within the non-volatile memory device; and
interpreting a sequence of illegal parameters that are part of the predefined sequence of multiple data access commands to access the predefined target file as a request by the host electronic system to read the stored serial number.

11. The method of claim 9, wherein the serial number is unique to the removable non-volatile memory device.

12. The method of claim 11, further comprising:
storing the serial number associated with the multimedia content file in a file header of the multimedia content file.

13. The method of claim 9, wherein the predefined sequence of multiple data access commands received at the removable non-volatile memory device corresponds to a predefined sequence of multiple file access commands executed at the host electronic system; and further comprising a trigger function for execution by the removable non-volatile memory device, responsive to the predefined sequence of multiple data access commands received from the host electronic system to cause the removable non-volatile memory device to activate the serial number access program, wherein the trigger function is stored in the removable non-volatile memory device.

14. The method of claim 9, further comprising:
accessing and conveying the multimedia content file to the host electronic system.

15. The method of claim 9, further comprising:
accessing and conveying to the host electronic system specified portions of data stored in the non-volatile memory.

16. A method of accessing multimedia content of a multimedia content file stored on non-volatile memory of a removable non-volatile memory device, the method comprising:
at a host electronic device having one or more processors,
executing a predefined sequence of multiple file access commands, wherein the predefined sequence is stored in the removable, non-volatile memory device;
in accordance with the executed predefined sequence of multiple file access commands sending to the removable non-volatile memory device a corresponding sequence of data access commands;
after sending a last data access command of the sequence of multiple data access commands, receiving from a serial number access program for execution by the removable non-volatile memory device, a first serial number that is durably stored in the removable non-volatile memory device; and
accessing at the host electronic device, the multimedia content of the multimedia content file stored in the removable non-volatile memory device only when the received first serial number accessed by the serial number access program from the removable non-volatile memory device matches a second serial number associated with the multimedia content file.

17. The method of claim 16, wherein the predefined sequence of multiple file access commands are commands stored by the memory controller to access a predefined target file stored on the removable non-volatile memory device, and wherein the sequence of multiple data access commands sent to the removable non-volatile memory device are stored by the memory controller and is interpreted by the removable nonvolatile memory device as a request by the host electronic device to read the first serial number accessed by the serial number access program from the removable non-volatile memory device.

18. The method of claim 17, further comprises:
accessing a file directory stored on the removable non-volatile memory device, the file directory including an entry for the predefined target file that specifies a storage location for the predefined target file that is a predefined storage location for the host electronic device to access the predefined target file stored within the removable non-volatile memory device,
wherein the sequence of multiple data access commands comprise commands to access the predefined storage location.

19. The method of claim 16, wherein the serial number is unique to the removable non-volatile memory device.

20. The method of claim 19, wherein the second serial number associated with the multimedia content file is included in a file header of the multimedia content file.

21. The method of claim 16, further comprising:
receiving the multimedia content file from the removable non-volatile memory device.

22. The method of claim 16, further comprising:
receiving specified portions of data stored in the non-volatile memory of the removable non-volatile memory device.

23. The removable non-volatile memory device of claim 1, wherein at least two commands in the predefined sequence of multiple data access commands contains at least one illegal parameter.

24. The removable non-volatile memory device of claim 1, wherein the plurality of programs configured for execution by the memory controller includes a program for accessing and conveying the multimedia content file to the host electronic system only when the serial number read from the removable non-volatile memory device matches a serial number associated with the multimedia content file.

25. The removable non-volatile memory device of claim 1, wherein the trigger function is stored in a memory of the memory controller.

26. The method of claim 9, further comprising a trigger function stored in a memory controller of the removable non-volatile memory device, wherein upon receiving the predefined sequence of multiple data access commands, the trigger function causes the reading of the stored serial number.

* * * * *